(12) United States Patent
Shieh

(10) Patent No.: US 6,749,214 B2
(45) Date of Patent: Jun. 15, 2004

(54) LOCKING DEVICE FOR A FOLDABLE GOLF CART

(76) Inventor: Shanq-Ching Shieh, 6 Fl., No. 105, Yung-An St., Yuanlin Chen, Changhua Hsien (TW)

( * ) Notice: Subject to any disclaimer, the term of this patent is extended or adjusted under 35 U.S.C. 154(b) by 28 days.

(21) Appl. No.: 10/157,109

(22) Filed: May 30, 2002

(65) Prior Publication Data

US 2003/0222428 A1 Dec. 4, 2003

(51) Int. Cl.[7] ................................................. B62B 3/14
(52) U.S. Cl. ...................... 280/651; 280/47.34; 280/62; 280/DIG. 6; 280/DIG. 5
(58) Field of Search ............................. 280/639, 655.1, 280/651, 654, 47.34, 47.41, 62, 642, 47.18, DIG. 6, DIG. 5; 16/231; 180/19.1, 19.2

(56) References Cited

U.S. PATENT DOCUMENTS

| | | | | |
|---|---|---|---|---|
| 4,793,622 A | * | 12/1988 | Sydlow | 280/40 |
| 4,869,526 A | * | 9/1989 | Blake | 280/645 |
| 5,201,540 A | * | 4/1993 | Wu | 280/646 |
| 5,281,044 A | * | 1/1994 | Chen | 403/328 |
| 5,582,419 A | * | 12/1996 | Lucia et al. | 280/42 |
| 5,749,424 A | * | 5/1998 | Reimers | 180/19.2 |
| 5,857,684 A | * | 1/1999 | Liao et al. | 280/40 |
| 6,000,712 A | * | 12/1999 | Wu | 280/639 |
| 6,152,465 A | * | 11/2000 | Shieh | 280/62 |
| 6,168,174 B1 | * | 1/2001 | MacDougall | 280/47.34 |
| 6,273,452 B1 | * | 8/2001 | Wu | 280/652 |
| 6,435,539 B1 | * | 8/2002 | Wu | 280/652 |

* cited by examiner

Primary Examiner—Brian L. Johnson
Assistant Examiner—Jeffrey J. Restifo
(74) Attorney, Agent, or Firm—Bacon & Thomas, PLLC

(57) ABSTRACT

A locking device for a golf cart has a bracket, two sleeves, an engaging bar and two securing members. The bracket is securely connected to an axle to which the rear wheels are mounted, and the stem of the golf cart is pivotally mounted on the bracket. The sleeves are securely connected to the bracket and securely mounted around the axle. The engaging bar is secured to the stem and near the bracket. The securing members are respectively rotatably mounted on the bracket and chassis, and each has a hook and a pressed segment extending outward from the chassis. Accordingly, the user can operate the locking device with foot, and to fold or to expand the golf cart is convenient.

5 Claims, 4 Drawing Sheets

LOCKING DEVICE FOR A FOLDABLE GOLF CART

BACKGROUND OF THE INVENTION

1. Field of the Invention

The present invention relates to a locking device, and more particularly to a locking device for a foldable golf cart and that can be easily operated with the foot of the user.

2. Description of Related Art

A golf cart is used to carry the objects for playing golf such as clubs, golf balls and so on, such that the golf player can play golf with ease and comfort. A conventional golf cart comprises a chassis, a front wheel, at least one rear wheel, an actuating device and a handle. The chassis is used to support the golf objects. The front wheel is rotatably attached to one end of the chassis, and the rear wheels are rotatably attached to the other end of the chassis. The actuating device is mounted on the chassis to actuate the rear wheels to rotate. The handle is connected to the chassis for the user to steer the movement of the golf cart. To reduce the space for storing or transporting the golf cart, a locking device is mounted between the chassis and the handle. Accordingly, the handle can be folded relative to the chassis, such that to store and to transport the golf cart is convenient.

However, the conventional locking device must be operated with the hand of the user. To operate the locking device, the user must squat down to manually release the securing device of the locking device. Consequently, the operation of the conventional locking device is inconvenient.

To overcome the shortcoming, the present invention tends to provide a golf cart to mitigate or obviate the aforementioned problems.

SUMMARY OF THE INVENTION

The main objective of the invention is to provide a locking device for a golf cart and that can be operated with the foot of the user. The locking device has a bracket, two sleeves, an engaging bar and two securing members. The bracket is securely connected to the axle on which the rear wheels of the golf cart are mounted, and the stem of the golf cart is pivotally mounted on the bracket. The sleeves are securely connected to the bracket and are securely mounted around the axle, such that the bracket is securely connected to the axle with the sleeves. The engaging bar is secured to the stem and near the bracket. The first securing member is rotatably mounted on the bracket and has a hook and a pressed segment extending outward from the chassis. The second securing member is rotatably mounted on the chassis and has a hook and a pressed segment extending outward from the chassis. One of the hooks of the securing members engages with the engaging bar when the stem is in an expansion position or a folded position relative to the chassis. With the pressed segments of the securing members, the user can operate the locking device with foot, and the operation of the locking device is convenient.

Other objects, advantages and novel features of the invention will become more apparent from the following detailed description when taken in conjunction with the accompanying drawings.

DETAILED DESCRIPTION OF PREFERRED EMBODIMENT

Figure 1:
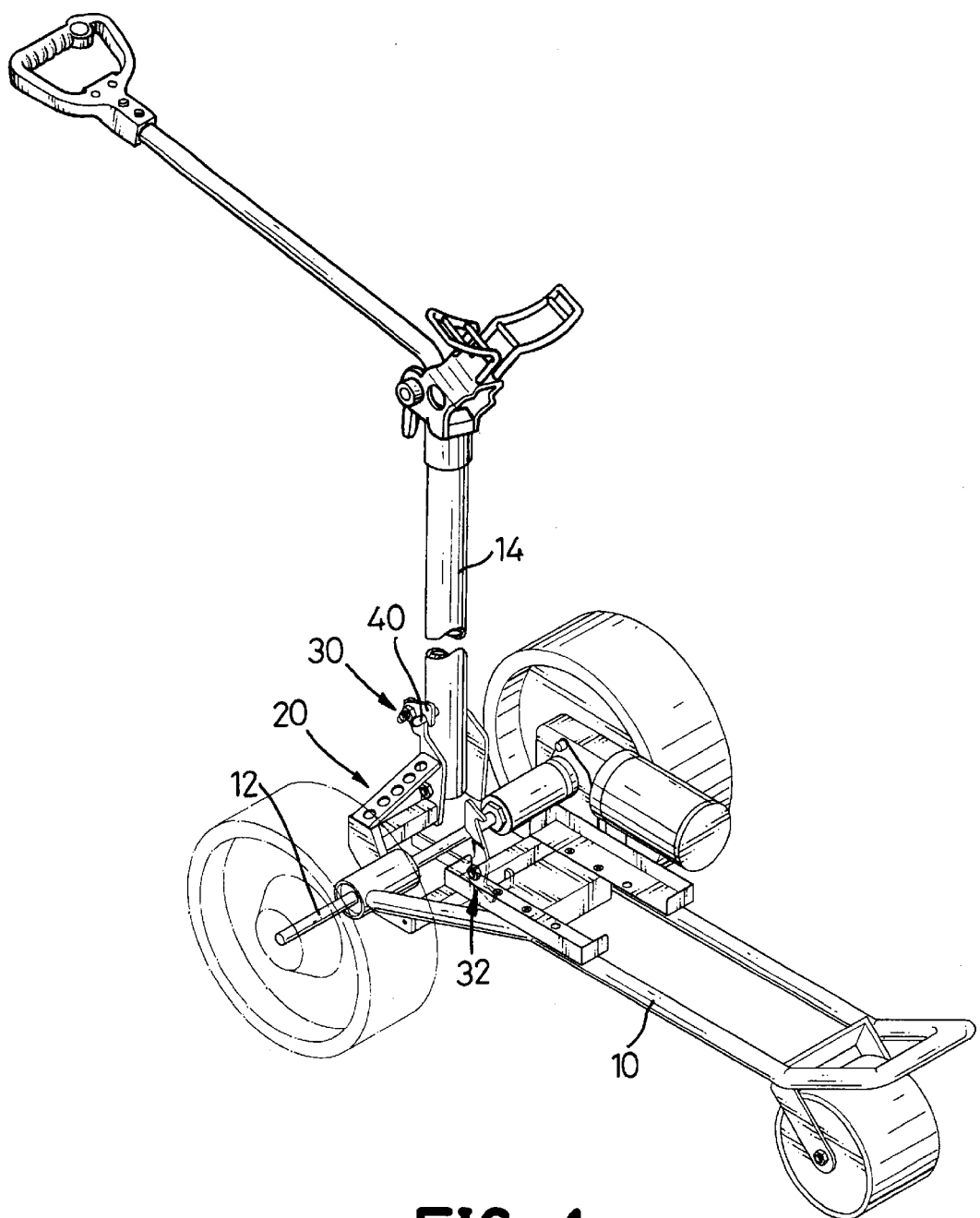
FIG. 1 is a perspective view of a golf cart with a locking device in accordance with the present invention.
Figure 2:
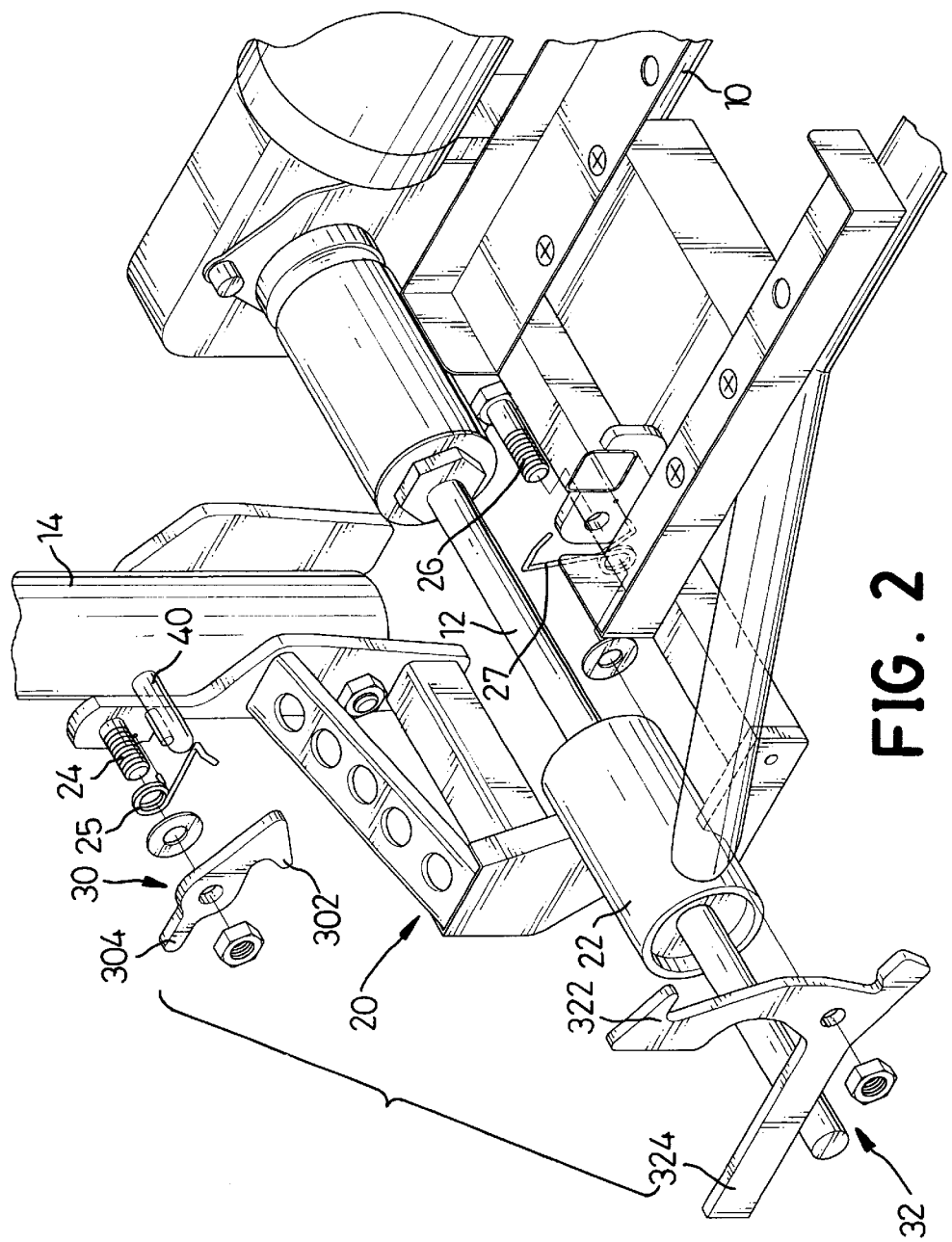
FIG. 2 is an exploded perspective view of the locking device in FIG. 1.

With reference to FIGS. 1 and 2, a locking device for a golf cart in accordance with the present invention comprises a bracket (20), two sleeves (22), an engaging bar (40) and two securing members (30, 32). The bracket (20) is securely connected to an axle (12) on which the rear wheels (not numbered) of the golf cart are mounted, and the stem (14) of the golf cart is pivotally attached to the bracket (20). The sleeves (22) are respectively securely attached to two sides of the bracket (20) and are securely mounted around the axle (12), such that the bracket (20) is securely connected to the axle (12) with the sleeves (22).

The engaging bar (40) is securely attached to the stem (14) and is near the bracket (20). The first securing member (30) is pivotally attached to the bracket (20) with a first pivot (24). A hook (302) is formed on one end of the first securing member (30) and corresponds to the engaging bar (40). A pressed segment (304) is formed on the other end of the first securing member (30) and extends outward from the chassis (10). A first torsion spring (25) is mounted around the first pivot (24) and has two ends respectively abutting the first securing member (30) and the bracket (20) so as to provide a recoil force to the first securing member (30).

The second securing member (32) is pivotally attached to the chassis (10) with a second pivot (26). A hook (322) is formed on one end of the second securing member (32) and corresponds to the engaging bar (40). A pressed segment (324) is formed on the other end of the second securing member (32) and extends outward from the chassis (10). A second torsion spring (27) is mounted around the second pivot (26) and has two ends respectively abutting the second securing member (32) and the chassis (10) so as to provide a recoil force to the second securing member (32).

Figure 3:
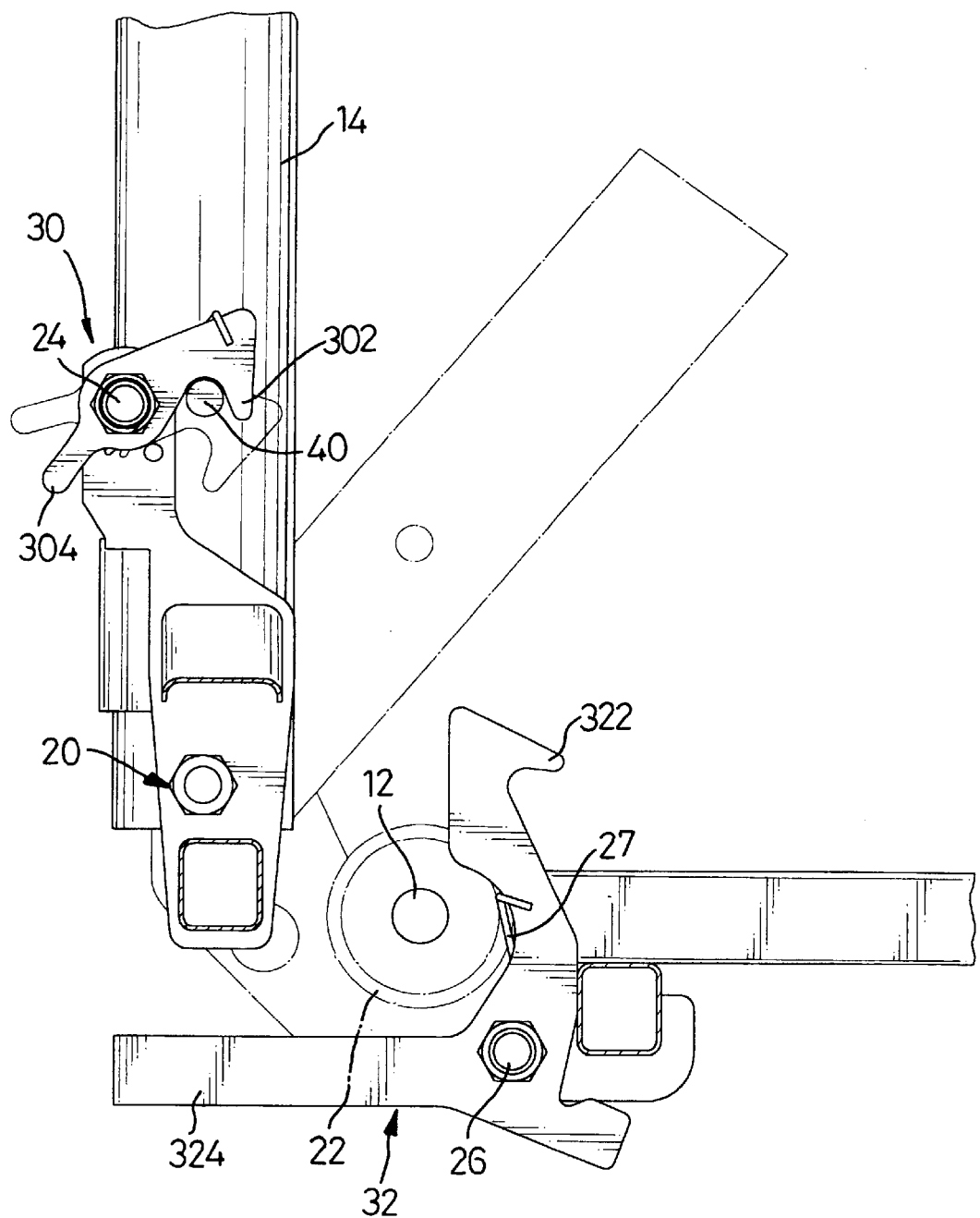
FIG. 3 is a side plan view of the locking device in FIG. 1 showing that the locking device is in an expansion position.

With reference to FIGS. 2 and 3, because the stem (14) is pivotally attached to the bracket (20), the stem (14) can pivotally rotate relative to the bracket (20). When the stem (14) of the golf cart is rotated to a vertical position relative to the bracket (20), the engaging bar (40) on the stem (14) will engage with the hook (302) on the first securing member (30) on the bracket (20). Consequently, the stem (14) of the golf cart can be held in an expansion position due to the engagement between the engaging bar (40) and the first securing member (30). The user can steer the golf cart with the expanded stem (14).

Figure 4:
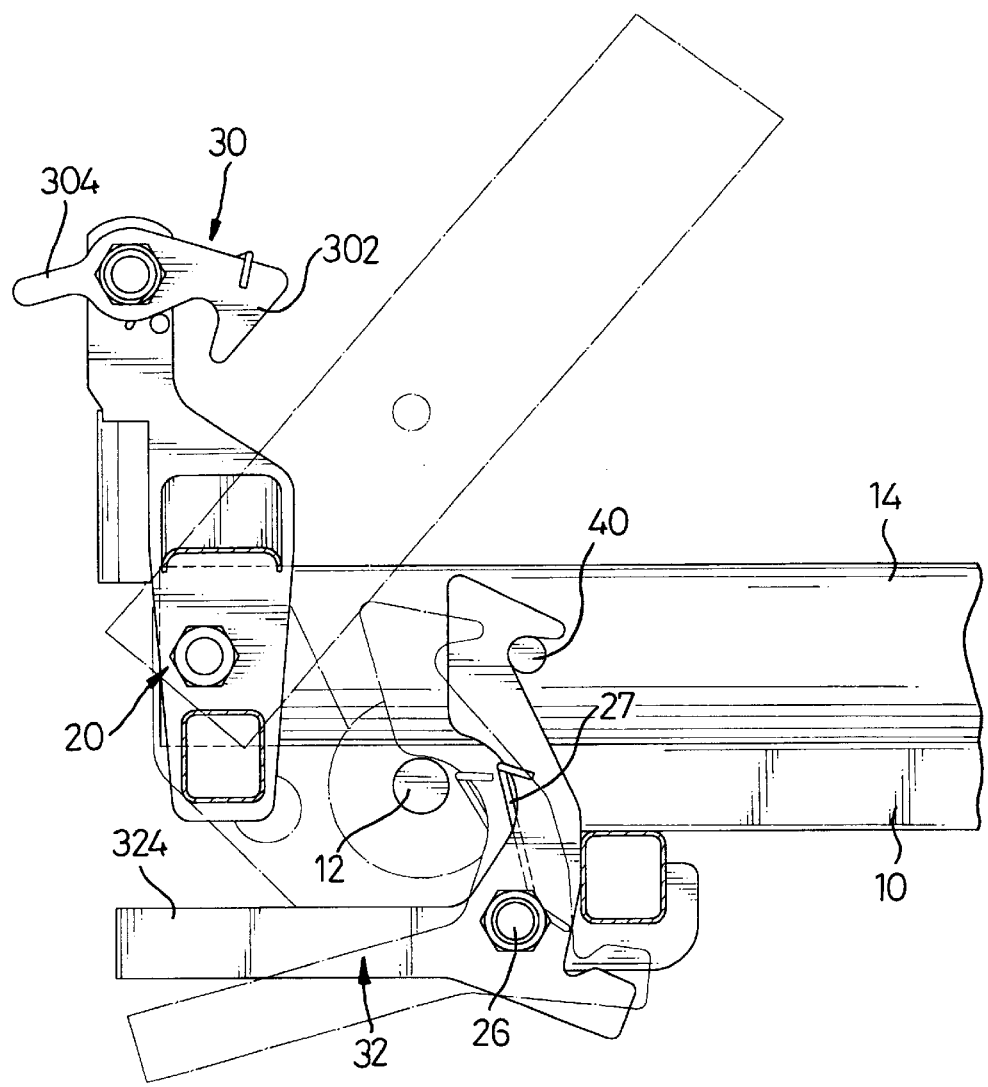
FIG. 4 is a side plan view of the locking device in FIG. 1 showing that the locking device is in a folded position.

With reference to FIGS. 2, 3 and 4, because the pressed segment (304) of the first securing member (30) extends outward from the chassis (10), the user can easily press the pressed segment (304) of the first securing member (30) with his or her foot. When the user presses the pressed segment (304) of the first securing member (30), the hook (302) of the first securing member (30) will release from the engaging bar (40) so as to unlock the stem (14). The locked condition of the stem (14) will be released, and the stem (14) can rotate relative to the bracket (20) and the chassis (10). When the stem (14) rotates to a position where the engaging bar (40) abuts the top of the second securing member (32), the engaging bar (40) will push the second securing member (32) to rotate relative to the chassis. Consequently, the engaging bar (40) will pass through the second securing member (32) and face the hook (322) of the second securing member (32). The hook (322) of the second securing member (32) will automatically engage with the engaging bar (40) due to the recoil force provided by the second torsion spring (27). Thereby, the stem (14) will be held in a folded position relative to the chassis (10), and the space for storing or transporting the golf cart can be reduced.

In addition, to expand the stem (14), the user can also press the pressed segment (324) of the second securing member (32) to release the locked condition of the stem (14) by foot. The first securing member (30) will also automatically engage with the engaging bar (40) when the stem (14) rotates to a vertical position relative to the chassis (10). Therefore, the user can operate the locking device with foot and so the need to squat down as found with the prior art is unnecessary, thus the operation of the locking device of the present application is convenient.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A locking device for a foldable golf cart having a chassis, a front wheel rotatably attached on one end of the chassis, at least one rear wheel rotatably attached to the other end of the chassis with an axle, a stem foldably connected to the chassis with the locking device and a handle foldably attached to a top of the stem, and the locking device comprising:

a bracket adapted to be securely connected to the axle and adapted for pivotally mounting the stem on the bracket;

two sleeves securely connected to the bracket and adapted to be securely mounted around the axle;

an engaging bar adapted to be secured to the stem and near the bracket; and a first securing member rotatably mounted on the bracket and having a first hook formed on one end of the first securing member to engage with the engaging bar when the stem is in an expansion position relative to the chassis and a first pressed segment formed on the other end of the first securing member and adapted to extend outward from the chassis.

2. The locking device as claimed in claim 1 further comprising a second securing member adapted to be rotatably mounted on the chassis and having a second hook formed on one end of the second securing member to engage with the engaging bar when the stem is in a folded position relative to the chassis and a second pressed segment formed on the other end of the second securing member and adapted to extend outward from the chassis.

3. The locking device as claimed in claim 1 further comprising a first pivot securely attached to the bracket and extending through the first securing member to pivotally attach the first securing member to the bracket with the first pivot; and a first torsion spring mounted around the first pivot and having a first end abutting the first securing member and a second end abutting the bracket.

4. The locking device as claimed in claim 3 further comprising a second pivot adapted to be securely attached to the chassis and extending through the second securing member to pivotally attach the second securing member to the chassis with the second pivot; and a second torsion spring mounted around the second pivot and having a first end abutting the first securing member and a second end adapted to abut the chassis.

5. The locking device as claimed in claim 1 further comprising a pivot adapted to be securely attached to the chassis and extending through the second securing member to pivotally attach the second securing member to the chassis with the pivot; and a torsion spring mounted around the pivot and having a first end abutting the first securing member and a second end adapted to abut the chassis.

* * * * *